(12) United States Patent
Guruprasad

(10) Patent No.: US 7,106,801 B1
(45) Date of Patent: Sep. 12, 2006

(54) DISTANCE DIVISION MULTIPLEXING

(76) Inventor: Venkata Guruprasad, Apt. B6, 35 Oak St., Brewster, NY (US) 10509

( * ) Notice: Subject to any disclaimer, the term of this patent is extended or adjusted under 35 U.S.C. 154(b) by 0 days.

(21) Appl. No.: 11/069,152

(22) Filed: Mar. 1, 2005

(51) Int. Cl.
*H04L 27/00* (2006.01)

(52) U.S. Cl. .................................... 375/259

(58) Field of Classification Search ............... 375/259, 375/220, 131, 138, 260, 272; 370/330, 321, 370/280, 281, 319, 478, 343, 344
See application file for complete search history.

(56) References Cited

U.S. PATENT DOCUMENTS

| | | | | |
|---|---|---|---|---|
| 5,619,503 A | * | 4/1997 | Dent | 370/330 |
| 5,796,776 A | * | 8/1998 | Lomp et al. | 375/222 |
| 5,903,238 A | * | 5/1999 | Sokat et al. | 342/365 |
| 6,842,617 B1 | * | 1/2005 | Williams et al. | 455/444 |

OTHER PUBLICATIONS

Shannon, C.E., "A Mathematical Theory of Communication", Bell System Technical Journal, Jul. 1948, pp. 379-423, vol. 27, United States.
Liu, Rueywen et al., "Autocorrelation—A New Differentiating Domain For Multiple Access Wireless Communications", Proceedings of ISCAS, 2002, United States.
Awater, Geert, "Reduced Complexity Space Division Multiplexing Receivers", Proceedings of IEEE Vehicular Technology Conference, May 2000, United States.
Ogawa, Yasutaka et al., "Channel Estimation and Signal Detection for Space Division Multiplexing in a MIMO-OFDM System", IEICE Transactions on Communications, vol. E88-B, No. 1, Jan. 2005, United States.
Barros, Altan K. et al., "Extraction of Specific Signals with Temporal Structure", Neural Computation; vol. 13, 2001, United States.
Mansour, Ali et al., "Blind Separation of Sources: Methods, Assumptions and Applications", IEICE Trans. Fundamentals, vol. E83-A, No. 8, Aug. 2000, United States.

* cited by examiner

*Primary Examiner*—Dac Ha
*Assistant Examiner*—Jaison Joseph
(74) *Attorney, Agent, or Firm*—Ostrager Chong Flaherty & Broitman P.C.

(57) ABSTRACT

A general method for extracting an electromagnetic or other wave-propagated signal of a desired source from the overall received waveform containing the sum of signals from a multitude of such sources, independently of signal contents and modulation. The method comprises the steps of first expanding the spectrum of the received sum of signals in proportion to their source distances so as to spectrally isolate the signal from the desired source, selecting the isolated signal spectrum using a bandpass filter, and finally, spectrally compressing the selected signal back to its original band of frequencies. The distance dependent expansion is performed by scanning the phase gradient of the signal spectrum. Related method for computing the spread of source distances by measuring low and high frequency bounds of the expanded sum of signals or subbands, or by plotting the expanded sum of signals or subbands on a graph.

20 Claims, 9 Drawing Sheets

DISTANCE DIVISION MULTIPLEXING

CROSS REFERENCE TO RELATED APPLICATIONS

This application claims the benefit of U.S. Provisional Patent Application No. 60/603,688 filed Aug. 24, 2004, the disclosure of which is incorporated herein by reference.

BACKGROUND OF THE INVENTION

1. Technical Field

This invention generally pertains to communication of information between a source and a receiver. More particularly, it concerns the use of source distance information at the receiver to ensure maximum bandwidth of communication and avoid noise and interference from other sources operating over the same frequencies.

2. Brief Description of the Prior Art

In his classic paper titled "A mathematical theory of communication" (*Bell System Technical Journal*, vol. 27, pages 379–423, 623–656, 1948), Claude E Shannon defined the object of communication technology as enabling the transfer of information from a source to a receiver. A perfect receiver should be accordingly defined as one that could receive an arbitrary signal f(r, t) from a transmitter at a relative distance r without noise, distortion or interference from any other source. Such an ideal receiver is unachievable by Shannon's theory, but current technology is especially worse off with respect to the criterion of interference, because it splits the available physical bandwidth in some way to keep the signals from multiple sources separate all the way. The separation techniques include frequency division multiplexing (FDM) used in radio and television broadcast, wavelength division multiplexing (WDM) and mode separation in optical fibres, spread-spectrum encoding or code division multiple access (CDMA), or time division multiplexing (TDM) and its asynchronous variant, the Ethernet. Recent variations of this theme include blind signal processing as discussed in the book titled *Adaptive Blind Signal and Image Processing* (Wiley, 2002, authors A Cichocki and S Amari), which uses statistical analysis to cope with the distortion of the original separation parameters by the wireless channel, and autocorrelation matching, in which a "prefilter" is applied at the source, as described by R Liu, H Luo, L Song, B Hu and X Ling in their paper titled "Autocorrelation—a new differentiating domain for multiple access wireless communication", in the *Proceedings of ISCAS*, 2002. All of these techniques effectively share the channel capacity corresponding to the usable physical bandwidth.

Lately, another such idea, using multiple transmitting and receiving antennae in parallel, is called space division multiplexing (SDM), as in the articles "Reduced complexity space division multiplexing receivers" by G Awater, A van Zelst and R van Nee in the *Proceedings of IEEE Vehicular Technology Conference*, May 2000, and "Channel Estimation and Signal Detection for Space Division Multiplexing in a MIMO-OFDM System", by Y Ogawa, K Nishio, T Nishimura and T Ohgane in *IEICE Transactions on Communications*, Vol. E88-B, No. 1, January 2005. The usage is debatable, since it concerns merely using a larger antenna cross-section to achieve a correspondingly larger channel, i.e. there is no actual division of space whatsoever, even though the parallel antennae could be using complementary polarizations, which, if used to transmit different channels, would have qualified as a form of space division multiplexing. However, it would still be far ambitious than the objects and motivation of the present invention, as follows.

If only we could string separate cables or fibres between each receiver and its selected source, the sharing of the channel capacity would become unnecessary, and the entire capacity of the cable or fibre link would become available to each receiver and its respective source. It is desirable to have a similar capability for wireless technology, which is being steadily pushed into increasingly higher frequency bands for bandwidth as channels compete within the same frequency bands over the same physical space. The main challenges are directivity and range selection. The first is partly addressed by using high operating frequencies so that the wavelengths are comparable to or less than the receiver dimensions, and partly by phased array technology, which enables source direction selection without physically moving an antenna. There has been no practical solution for the second, although as range and angle are mutually complementary as physical dimensions of space, and on that basis, a similar, receiver-side technology could have intuitively thought possible.

The present invention is a solution based on a method for enabling a receiver of electromagnetic or other waves to determine the distance r to the source of the waves by modifying a receiver parameter, as described in copending application titled "Passive distance measurement using spectral phase gradients", filed 2 Jul. 2004, No. 10/884,353, incorporated here in its entirety by reference. The method involves varying an instantaneous frequency selector $\hat{w}$ at the receiver at a rate $\alpha$, whereby frequency shifts $\delta w$ become induced in the received waves in proportion to $\alpha r$, so that r can be computed from $\alpha$ and $\delta w$. This method avoids round trip timing (RTT) and coherent phase reference requirements, but it depends on the phase distribution, which is already utilized in current technology. For example, any kind of modulation as such involves a nonzero bandwidth spread, and frequency modulation (FM) especially relates to phase modulation (PM), PM itself is also in use, for instance, in data modems as quadrature phase shift keying (QPSK), and for the encoding of colour in PAL and SECAM broadcast television formats, and in any case, all signal processing, including the autocorrelation matching and the blind signal processing methods mentioned above, involve manipulation of the signal phase.

It has not been obvious, therefore, that this method can be used for source selection without being impacted by modulation or signal processing, and without interfering with these operations. Moreover, in the presence of a modulating signal, a received carrier is no longer an almost pure sinusoid, as would appear to be assumed in the copending application, so that even the inferred distance $r(\hat{w})$ would vary significantly over the received modulated carrier bandwidth.

It is in fact generally unobvious how any form of distance determination could help in signal selection or source isolation. An independent review of the copending application method observed, for example, that timing or coordinate information from the global positioning system (GPS) could be encoded in transmitted signals to enable source distance determination without RTT or coherent phase reference. While the method could have other applications, it would be specific to signals actually bearing the encoded coordinate or timing information and thus less than general. The encoded information would be generally available only after the signals are separated, and would be thus useless for the separation itself.

A hitherto unaddressed need exists, therefore, for a method that can separate signals from multiple sources, that does not interfere with the signal phase distribution or depend on the signal form or content, and would enable the entire physical bandwidth available from a source to be utilized for communication with only that source, without interfering with signals from another source. Such a separation is available for sources located at different directions from the receiver using phased array antennae as remarked, but not for sources along roughly the same direction and differing only in distance. It would be also desirable to have a method that can be applied over a large gamut of operating wavelengths, for example, from radio waves to ultraviolet frequencies, and even to acoustic waves. It would be additionally desirable for the method to be also useful for detecting the presence of multiple sources, i.e. of interference, so as to enable a receiver to lock on to and track a selected source.

SUMMARY OF THE INVENTION

Accordingly, a primary object of the present invention is to provide a very general mechanism, which would be largely independent of signal form and content, for separating signals from multiple sources even when the sources are located along roughly the same direction from the receiver. Another object is to enable, at a receiver, most if not the entire physical bandwidth between a source and the receiver to be made available for communication between them, without interfering with communication from other sources or receivers. A secondary object is to provide a general means for detecting such interference and determining the causative source distance distribution.

Principle of Operation

This object, and others which will become apparent, are achieved in the present invention, within a receiver receiving an overall waveform comprising a combination of signals $\Sigma_j F_j(w)$ from a multitude of sources $s_j$ at distinct respective distances $r_j$, by applying a succession of transformations to the received combination of signals, as will be shortly described. The notations $\mathcal{L}[\ ]$ and $\mathcal{H}[\ ]$ will be used to denote the lower and upper frequency bounds, respectively, relative to a predefined threshold amplitude $a_{th}$, i.e.

$$|F_j(w)|^2 < |a_{th}|^2 \text{ if } w \leq L[F_j] \text{ or } w \geq H[F_j]. \qquad (1)$$

Correspondingly, $W_j = \mathcal{H}[F_j] - \mathcal{L}[F_j]$ will denote the respective bandwidths, so that $$(\mathcal{H} - \mathcal{L})\ [F_j(w)] = \mathcal{H}[F_j(w)] - \mathcal{L}[F_j(w)] \leq W_j. \qquad (2)$$

A nominal bandwidth $W \geq W_j$ can be assumed as non overlapping portions of the spectra would be separable by filters. The inventive procedure for extracting a specific signal $F_i$ then comprises the steps of A. optionally first splitting the combined received signal into n>1 subbands of successive widths $\beta_1 W, \beta_2 W, \ldots \beta_n W$, i.e. into subbands $$\left[\mathcal{L} + \sum_{\mu=1}^{n-1} \beta_\mu W, \mathcal{L} + \sum_{\mu=1}^{n} \beta_\mu W\right], \mu = 1 \ldots n \qquad (3)$$

using a set of subband filters $S_\mu$, so that $\Sigma_\mu^n \beta_\mu = 1$, and, writing $\{F_j\}$ as short for $\Sigma_j F_j$, we would have $$\mathcal{L}[S_\mu\{F_j\}] = \mathcal{L}[\{F_j\}] + \sum_{\mu=1}^{n-1} \beta_\mu W \text{ and} \qquad (4)$$

$$\mathcal{H}[S_\mu\{F_j\}] = \mathcal{L}[S_\mu\{F_j\}] + \beta_\mu W;$$

B. applying to each subband $S_\mu\{F_j\}$ of the input signal $\{F_j\}$ a time-varying sampling or frequency selection mechanism as described in the copending application, characterized by a parameter $\alpha_\mu$ independent of the source, and hence of the subscript j, to cause the subband spectrum to be linearly shifted to $$H(\alpha_\mu)F_{\mu j}(w) = F_{\mu j}(w/[1+\alpha_\mu r_j]) \text{ where } F_{\mu j} \equiv S_\mu F_j, \text{ i.e. by shifts } \delta w_j = w\alpha_\mu r_j; \qquad (5)$$

C. then applying a selection filter $\tilde{G}_{\mu i}$ to the resulting shifted spectral sum to particularly select $H_\mu F_{\mu i} \equiv H(\alpha_\mu) F_{\mu i}(w)$ and reject $H_\mu F_{\mu j}$ for all $j \neq i$, i.e.

$$\tilde{G}_{\mu i} H_\mu \sum_j F_{\mu j} \approx H_\mu \delta_{ij} \sum_j F_{\mu j} = H_\mu F_{\mu i}, \text{ where} \qquad (6)$$

$$\delta_{ij} \equiv \begin{cases} i & (i = j) \\ 0 & (i \neq j) \end{cases}$$

and is approximate because the stop band rejection of real filters cannot be unity, so that $$\tilde{G}_{\mu i} H_\mu \approx H_\mu G_{\mu i} \delta_{ij}, \qquad (7)$$

where $G_{\mu i} \equiv G_\mu$ denotes corresponding baseband filters of bandwidths $\beta_\mu W$;

D. applying the reverse mechanism $H_\mu^{-1} \equiv H^{-1}(\alpha_\mu) = H(-\alpha_\mu)$ to shift the result $H_\mu F_{\mu i}$ back to $F_{\mu i}$;

E. and lastly, putting the subbands $F_{\mu i}$ back together, in reverse to Step A, to obtain $F_i$.

Note that Steps D and E can be interchanged, i.e. the subbands can be summed before applying the reverse mechanism, if the $\alpha_\mu$ are equal. These steps form successive stages of signal processing in the receiver. The essence of the separation, contained in Steps B through D, is summarized by the following process flow:

$$\{F_{\mu j}\} \xrightarrow{H(\alpha_\mu)} H_\mu \{F_{\mu j}\} \xrightarrow{\tilde{G}_{\mu i}} \tilde{G}_{\mu i} H_\mu \{F_{\mu j}\} \approx \qquad (8)$$

$$H_\mu G_{\mu i} \delta_{ij} \{F_{\mu j}\} \approx H_\mu F_{\mu i} \xrightarrow{H^{-1}(\alpha_\mu)} F_{\mu i},$$

and may be alternatively summarized as a product of operations of the form $$F_{\mu i} \approx H^{-1}(\alpha_\mu)\tilde{G}_{\mu i}H(\alpha_\mu)\sum_j F_{\mu j} \qquad (9)$$

corresponding to the orthogonality relation $$H^{-1}(\alpha_\mu)\tilde{G}_{\mu i}H(\alpha_\mu) \approx \delta_{ij}. \qquad (10)$$

The utility of the method lies in the fact that the H operations depend only on $\alpha_\mu$ which are independent of the signal sources, the latter being distinguished by the indices i or j in the above equations. The separation is obtained spectrally via the transformed filters $\tilde{G}_{\mu i} \sim H_\mu G_{\mu i}$ (equation 7), applied in the transformed space as $H_\mu^{-1}\tilde{G}_{\mu i}H_\mu$, per equation (9), instead of baseband filters $G_{\mu i}$, which per se cannot provide the separation. The design of $\tilde{G}_{\mu i}$ can be derived from that of $G_\mu$ by frequency scaling it by $\alpha_\mu r_i$ using known principles of filter design; the estimation of $r_i$ for this purpose will be described shortly.

The utility of subband processing is as follows. Consider that in its absence, amounting to taking n=1 and β=1, only a single parameter α would be applied at the receiver. If $r_i \leq r_{i+1}$, the following general inequality must hold using the short notation $\mathcal{H}_i$ for $\mathcal{H}[F_i]$ and $\mathcal{L}_i$ for $\mathcal{L}[F_i]$:

$$(1+\alpha r_i)\mathcal{H}_i \leq (1+\alpha r_{i+1})\mathcal{L}_{i+1}. \qquad (11)$$

Solving for α from the first inequality yields $$\alpha r_i \geq \frac{\mathcal{H}_i - \mathcal{L}_{i+1}}{(1+\delta r_i/r_i)\mathcal{L}_{i+1} - \mathcal{H}_i}, \qquad (12)$$

which simplifies, for the common case of sources with identical component bandwidth allocations, to $$\alpha r_i \geq \frac{W}{(\delta r_i/r_i)\mathcal{L} - W} = \left[\frac{\delta r_i}{r_i}\frac{\mathcal{L}}{W} - 1\right]^{-1}. \qquad (13)$$

This bound diverges at small $\mathcal{L}$, being positive only if $$\mathcal{L} > \frac{r_i}{\delta r_i}W, \text{ or, equivalently, } \delta r_i > r_i\frac{W}{\mathcal{L}}, \qquad (14)$$

but no choice of α will suffice if $\mathcal{L}$ is less than this value.

For example, at $\mathcal{L}=0$, the bound will be negative, but the foregoing procedure cannot possibly separate the signals because the d.c. (w=0) components will not be shifted at all, as $H(\alpha)F_j(0) = F_j(0[1+\alpha r_j]) = F_j(0)$ by equation (23). The problem is that the lower bound and the spread $W \equiv \mathcal{H} - \mathcal{L}$ are also scaled by H(α), so that the lower part of the signal spectrum tends to remain in the "spectral shadow" of any nearer sources. This is not a special limitation of the method—very low frequencies as such generally pose problems such as the ratings of reactive elements needed for d.c. isolation, due to which baseband audio and video systems are invariably designed with lower frequency bounds well above 0. With modulated radio frequency signals, the limiting constraint becomes the physical source separation $\delta r_i$, instead of $\mathcal{L}$.

For any given $\mathcal{L}$ and W, there would thus be a sizeable range of $\delta r_i$ over which a complete separation of signals would be impossible. However, if $\mathcal{L}>0$, partial separation of a fraction $\beta \in [0,1]$ of the bandwidth becomes possible, with the lower bound on α set by the condition $$\alpha r_i \geq \left[\frac{\delta r_i}{r_i}\frac{\mathcal{L}}{\beta W} - 1\right]^{-1} \text{ requiring only } \delta r_i > \beta r_i\frac{W}{\mathcal{L}}. \qquad (15)$$

Although β signifies a compromise on the full separation of the signal spectrum, the separation is nevertheless useful as the separated parts comprise the lower frequency band $[\mathcal{L}, \mathcal{L}+\beta W]$ from the nearer source and the higher frequency band $[\mathcal{H}-\beta W, \mathcal{H}]$ from the farther source, which will likely contain much of the information. In particular, if the signal is preconditioned for separation by autocorrelation, the separated high frequency band $[\mathcal{H}-\beta W, \mathcal{H}]$ would serve as a strong reference for autocorrelative separation of the remainder of the signal bandwidth $[\mathcal{L}, \mathcal{H}-\beta W]$. With subband processing, however, the conditions (15) become $$\alpha_\mu r_i \geq \left[\frac{\delta r_i}{r_i}\frac{\mathcal{L}_\mu}{\beta_\mu W} - 1\right]^{-1} \text{ requiring only } \delta r_i > \beta_\mu r_i\frac{W}{\mathcal{L}_\mu}, \qquad (16)$$

where $\mathcal{L}_\mu$ is the lower frequency bound of the μth subband. These conditions are weaker than (13) and (14) by the factor $\beta_\mu$, and assure separability for all subbands μ>1 even at $\mathcal{L}=0$, as the subband lower bounds are raised to $\mathcal{L}_\mu \equiv \mathcal{L} + \Sigma_{\mu=1}^{n-1}\beta_\mu W$ per equation (3).

Thus, with subband processing, near perfect separability can be assured in all cases, without a fundamental need for autocorrelation or other techniques that would involve signal modulation or content. It is generally desirable, however, to keep the subbands as wide and as few in number as possible, however, because each subband entails shifting, filtering and reverse shifting operations, adding linearly to the complexity of the receiver. It would be generally preferable, therefore, to keep n small, and indeed as close to 1 as possible.

The secondary object of detecting interference and estimating the source distribution may be achieved by a simple variation of this procedure, comprising, after Step B, the alternative steps of C'. measuring the lower bound $\mathcal{L}[H(\alpha_\mu)S_\mu\{F_j\}]$ to compute the distance $r_{min}$ of the nearest source as $$r_{min}^{(\mu)} = \alpha_\mu^{-1}\left(\frac{\mathcal{L}[H(\alpha_\mu)S_\mu\{F_j\}]}{\mathcal{L}[S_\mu\{F_j\}]} - 1\right), \qquad (17)$$

obtained from the relation $$\mathcal{L}[H(\alpha_\mu)S_\mu\{F_j\}] = (1+\alpha_\mu r_1)\mathcal{L}[S_\mu\{F_j\}], \qquad (18)$$

identifying the minimum of the μ-th subband of the shifted combined spectrum with the shifted lower frequency bound of that subband—the result will be nonzero if either $\mathcal{L}>0$ or μ>1;

D'. and likewise measuring the upper bound $\mathcal{H}[H(\alpha_\mu)S_\mu\{F_j\}]$ to compute the distance $r_{max}$ of the farthest source from the corresponding relation $$r_{\max}^{(\mu)} = \alpha_\mu^{-1}\left(\frac{\mathcal{H}[H(\alpha_\mu)S_\mu\{F_j\}]}{\mathcal{H}[S_\mu\{F_j\}]} - 1\right), \quad (19)$$

so that the spread of sources would be given by the vector of distance intervals $\{\delta r^{(\mu)}\}$ where $$\delta r^{(\mu)} = r_{max}^{(\mu)} - r_{min}^{(\mu)} \geq 0. \quad (20)$$

In the numerators of equations (17) and (19), $\mathcal{L}$ and $\mathcal{H}$ are measured from the spectra, whereas in both the denominators of these equations and in Steps A–E of the main inventive procedure, $\mathcal{L}$ and $\mathcal{H}$ are likely to be known parameters of design. The bound measurements may be performed in reverse order. Importantly, as they concern derivatives of spectral distributions, thee measurements would be difficult if the spectra are discontinuous. Smoothening, interpolative and correlative techniques may be accordingly employed.

The maximum and minimum spread can be clearly estimated from these subband-specific values as $$\delta r_{\max} = \max_\mu \{r_{\max}^{(\mu)}\} - \min_\mu \{r_{\min}^{(\mu)}\} \text{ and} \quad (21)$$

$$\delta r_{\min} = \min_\mu \{r_{\max}^{(\mu)}\} - \max_\mu \{r_{\min}^{(\mu)}\}, \text{ respectively.}$$

The likelihood of detecting interference and separating the interfering sources would clearly improve with narrower subbands, as the interference might occur within the signal bandwidth W, and riot affect the ends of the signal spectrum, i.e. $\delta r^{(\mu)} > 0$ for only some indices $\mu$ such that $1 < \mu < n$. This would not be an issue for interfering sources of similar band spreads. However, the technique would be also useful for eliminating narrow band noise or other narrow band signals that happens to occur within the desired signal spectrum, for this, a large n, or small $\delta_\mu$, would be required.

If the object is to merely detect all such interference, it would be more productive to use a single, sufficiently large shift factor $\alpha$ and a single tunable subband filter $S(\hat{w})$ of a variable centre frequency $\hat{w}$ and a narrow pass-band $\delta W \ll W$, in order to periodically scan the received signal spectrum for interference. The modified procedure in this case would be $A^*$. applying the tunable filter $S(\hat{w})$ to the total received signal $F(w)$ (corresponding to $\{F_j\}$), for which $$\mathcal{L}[S(\hat{w})F(w)] = \hat{w} - \delta W/2 \text{ and } \mathcal{H}[S(\hat{w})F(w)] = \hat{w} + \delta W/2, \quad (22)$$

to obtain the filtered subband $S(\hat{w})F(w) \equiv (S \circ F)(w) \approx F(\hat{w})$ at $\hat{w}$ and vanishing outside of $\hat{w} \pm \delta W/2$;

$B^*$. applying to the filtered subband $(S \circ F)(w)$ a time-varying sampling or frequency selection mechanism as described in the copending application, characterized by a parameter $\alpha$, to cause the filtered subband's spectrum to be linearly shifted to $$H(\alpha)(S \circ F)(\omega) = \sum_r F(\omega[1+\alpha r]) \approx \sum_r F(\hat{\omega}[1+\alpha r]) \quad (23)$$

i.e. by shifts $$\delta\omega \approx \hat{\omega}\alpha r$$

for each contributing noise or signal source at respective distance r;

$C^*$. and measuring the lower and upper bounds $\mathcal{L}[H(\alpha)(S \circ F)(w)]$ and $\mathcal{H}[H(\alpha)(S \circ F)(w)]$, respectively, of this shifted subband in order to compute the minimum and maximum contributing source distances $$r_{\min}(\hat{\omega}) = \quad (24)$$

$$\alpha^{-1}\left(\frac{\mathcal{L}[H(\alpha)(S \circ F)(\omega)]}{\hat{\omega} - \delta W/2} - 1\right) \approx \alpha^{-1}\left(\frac{\mathcal{L}[\sum_r F(\hat{\omega}[1+\alpha r])]}{\hat{\omega} - \delta W/2} - 1\right)$$

and $$r_{\max}(\hat{\omega}) =$$

$$\alpha^{-1}\left(\frac{\mathcal{H}[H(\alpha)(S \circ F)(\omega)]}{\hat{\omega} - \delta W/2} - 1\right) \approx \alpha^{-1}\left(\frac{\mathcal{H}[\sum_r F(\hat{\omega}[1+\alpha r])]}{\hat{\omega} - \delta W/2} - 1\right),$$

respectively, as a function of the subband centre frequency $\hat{w}$. We may likewise compute $$\delta r_{\max}(\delta W) = \max_{\hat{\omega}} r_{\max}(\hat{\omega}) - \min_{\hat{\omega}} r_{\min}(\hat{\omega}) \text{ and} \quad (25)$$

$$\delta r_{\min}(\delta W) = \min_{\hat{\omega}} r_{\max}(\hat{\omega}) - \max_{\hat{\omega}} r_{\min}(\hat{\omega})$$

corresponding to equation (21), but generally representative of the filter bandwidth $\delta W$ chosen, or other statistics from the $r_{min}(\hat{w})$ and $r_{max}(\hat{w})$ distributions depending on the application.

Implementation

The above inventive procedures are independent of the physical nature of the signals and their wavelength range. An equally general method for inducing the frequency shifts in the received waveforms, per equation (23) and orthogonally to their modulated information so as to be suitable for the objects of this invention, is provided by the copending application as mentioned. The method concerns the spectral phase distribution of a signal, which can be obtained using any appropriate spectrometric means, such as resonant cavities or circuits, diffraction gratings for optical signals, and digital signal processing for electronic media. Specifically, as stated in the Background, it involves scanning the gradient of this phase distribution over the signal spectrum by continuously varying the instantaneous tuning $\hat{w}$ of the resonant cavity or circuit, the intervals $d \equiv n\lambda\sin\theta$ (for any given diffraction angle $\theta$) of the grating, or the sampling interval $T \equiv 1/\hat{w}$ of the digital processing system, each at the same normalized rate $\hat{w}^{-1}d\hat{w}/dt \equiv \hat{\lambda}^{-1}d\hat{\lambda}/dt \equiv T^{-1}dT/dt$ equal to $c\alpha$ (or $c\alpha_\mu$), where c denotes the wave speed. It is shown in the copending application that linear frequency shifts obeying equation (23) result without otherwise affecting amplitude or phase. The reverse mechanism in Step D follows from the shift formula $w \to w(1+\alpha r)$. The formula also permits negative choices for $\alpha$, but only positive values widen the spectrum, which is necessary for the inventive procedures.

Orthogonality to the signal content comes from the fact that the distance information in the phase gradient is an inherently spatial contribution, derived from the spatial contribution $k \cdot r$ in the expression $\phi = k \cdot r - wt$ for the total instantaneous phase of a travelling wave, whereas signal content and modulation ordinarily refer strictly to the temporal term wt. If r were to vary so as to interfere with the signal contribution, the variation would be in the form of a Doppler shift, which would not be new, and can be corrected for where necessary. If the r variation were instead random or oscillatory, at frequencies comparable to that of the signal, it would as such interfere with the reception, even in absence of other sources. So the distance information r can be exploited to separate or extract a set of signals by this method if they can at all be individually received.

A modulated signal may be conversely viewed as a jitter in the carrier's source distance indication, which makes the shifted modulated carrier frequency uncertain, relative to the shifted unmodulated carrier, by a spread of $\{w_c(1+\alpha r_1), w_c(1+\alpha r_2)\}$, where $r_1$ and $r_2$ are the minimum and the maximum values for r, respectively, revealed by the spectral phase gradient, and $w_c$ is the carrier frequency. Its spectral footprint is then the interval $[\mathcal{L}[HF], \mathcal{H}[HF]]=H[\mathcal{L}[F], \mathcal{H}[F]]$, i.e. H times the unshifted original footprint of the modulated carrier, due to the linearity of H. By the principles of Fourier analysis, these spectral bounds are simply equivalent to indefinitely stationary sinusoidal components including the result of modulation, and involve no extra uncertainty.

Embodiments

In general, a receiver embodying the present invention would thus generally include
  zero or more optionally tunable input filters $\{S_\mu\}$ and at least one optionally tunable selection filter $\tilde{G}$;
  and one or more fixed or variable mechanisms for shifting $H(\alpha)$ and reverse shifting $H(-\alpha)$ as explained.

The receiver would additionally include either
  a fixed or variable means for setting either $\alpha$ or $\tilde{G}$, or both, in order to select a desired signal $F_i$ and reject interfering signal or noise sources, according to Steps A through E; or
  low and high spectral bound detector means for determining $\mathcal{L}$ and $\mathcal{H}$ particularly of the shifted spectra, $H_\mu\{F_{\mu j}\} \equiv H(\alpha_\mu)S_\mu\{F_j\}$ in Steps C' and D', along with optional means for varying one or more of the subband filters S, so as to vary the corresponding subband intervals and to thus detect interference within the signal spectrum, according to the alternative Steps C' and D' in the inventive procedure.

Alternatively, a receiver may use a single tunable subband filter $S(\hat{w})$ and one set of spectral bound detector means applied to $H(\alpha)(S \circ F)(w)$ per equation (24) to continually scan the entire signal bandwidth W using the modified inventive procedure of Steps $A^*$ through $C^*$.

Both of the inventive functions, of separating the signal from a desired source and of detecting interference within the signal band, may be implemented within a given receiver, for use one at a time or in parallel. The spectral bound detectors may be also applied to the unshifted spectra for accuracy of measurement, in which case the same threshold $a_{th}$ (equation 1) must be employed. In principle, the subband filters should suffice to ensure that spectral discontinuities within a subband do riot matter—it should be sufficient to scan inward from the extremities of the spectrum to the first crossing of the threshold magnitude $\pm a_{th}$. However, as noise can generate false threshold crossings, one or more of the following schemes ould be generally necessary: set the threshold $|a_{th}|$ above a sufficiently high empirically determined value, compare several successive samples to skip over narrower noise spikes, or average over several successive frames, which is common in spectral measurements. More sophisticated techniques involving smoothening, interpolation or autocorrelation over the spectrum may also be used. None of these schemes is usually an option for Steps C and D for selecting a desired signal, however.

A basic receiver need not employ subbanding at all, and thus skip Steps A and E. A more sophisticated receiver may use subbanding, and would need a multitude of input subband filters $\{S_\mu\}$. With subbanding, it would be often also useful to use a smaller $\alpha_\mu$ for the higher subbands, while using sufficiently high values for the low subbands, so as to keep the shifted spectra within the handling range of the circuits; this would not be a concern with digital signal processing. The shift parameter $\alpha$ may be alternatively fixed at a large enough value for the intended operating distance range. Large values of $\alpha$ can be achieved using short time frames in the shifting mechanism, as also described in the copending application. The desired signal $F_i$ can then be selected by varying $\tilde{G}$, or switching between a set of fixed filters $\{\tilde{G}_i\}$. The alternative would be to use a single fixed selection filter $\tilde{G}$, and to vary $\alpha$ in order to bring $F_i$ into the pass band of $\tilde{G}$. In either case, the variation may be performed manually through suitably implemented controls or knobs, or automatically by scanning the combined shifted spectrum $\{H(\alpha)F_j\}$ for a signal matching some selection criteria, such as a spread-spectrum code, a specific subcarrier, a signature pattern, etc. that could be predefined, interactively set or acquired from a previously selected signal, so as to lock on to that source.

These selection and detection functions may also be combined in a receiver, by the use of separate detection and source separation modules, each containing its own instances of both the subband filters S and the frequency spreading shift mechanisms H. In such a receiver, the detection module may use relatively narrow subbands to dynamically determine the coarsest subband partitioning of the signal spectrum to simplify the operating configuration of source selection module, and to thus ensure better performance or lower the total power consumption. Another variation would be to keep the inventive selection module on standby, so as to only activate it in the presence of interference. The onset of interference may be detected automatically using the inventive Steps C' and D', simplistically without partitioning into subbands, or more particularly with subbands, or more accurately using a single scanning subband, as in Steps $A^*$ through $C^*$. An alternative arrangement could also be employed for the interference detection in order to activate the inventive source selection procedure. In the case of audio or video communication, the inventive signal selection procedure may even be manually activated or turned off based on perception of interference.

If multiple antenna or aperture feeds are available, e.g. as stereoscopic or array antennae or microphones, the range separation can be combined with the angular information from the feeds to determine the source locations over two or three dimensional space, as opposed to the one dimensional range distribution of sources that can be determined using a single feed. In all of these cases, the determined spatial distribution of sources can be displayed to the user to allow visual perception of interference and interactive selection.

More particularly, the inventive interference detection procedure of Steps C' and D' or Steps $A^*$ through $C^*$ is not necessary in these cases. With stereo- or quadraphonic acoustic feeds, the two or three dimensional spatial distribution of the sources would be revealed by a diagram of circles, or spherical surfaces, drawn with radii corresponding to the peaks in the shifted spectrum and centred on the geometrical representations of the feeds or microphones, with intensities proportional to the (analogue) energy distribution of the shifted spectrum $H(\alpha)S\{F_j\}$, i.e. $|H(\alpha) S\{F_j\}|^2$. Correspondingly, an automatic (non interactive) source selection system may use the phase differences between the feeds to discriminate in direction as well as distance.

Variations

Numerous variations of the inventive procedures are possible and are intended within the present invention.

For example, prefiltering may be also employed to alter the spectral profile over the desired band in order to simplify, or correct for limitations in, the design of the selection filter $G_i$. The prefiltering could include compressing the signal spectrum, using frequency modulation say, and Step D could likewise be accomplished by "mixing", i.e. by multiplying with a generated intermediate frequency signal, or by frequency modulation. If the same value of $\alpha$ is used for each of the subbands in Step B, Step E could be performed before Step D, as mentioned, with the advantage that only one reverse shifting mechanism is needed, though it must then handle the combined shifted bandwidth of all of the subbands.

Further, the input signal spectrum may be expanded before Step B using frequency modulation to limit noise arising in the subsequent stages. The final stage may likewise comprise a more complex combination of mixing and spectral expanding or compacting. Additionally, a receiver needing to monitor multiple sources may be designed using a common shift mechanism in Step B and multiple selectors $G_i$, each differently designed and fed the same shift mechanism output in parallel, or using identical selectors but fed by differently designed or tuned shift mechanisms, the latter being each fed the same input combination of signals.

Other objects, features, applications, variations and advantages of the present invention will be apparent when the detailed description of the preferred embodiment is considered in conjunction with the drawings, which should be construed in an illustrative and not limiting sense.

DETAILED DESCRIPTION OF THE PREFERRED EMBODIMENT

Figure 1:
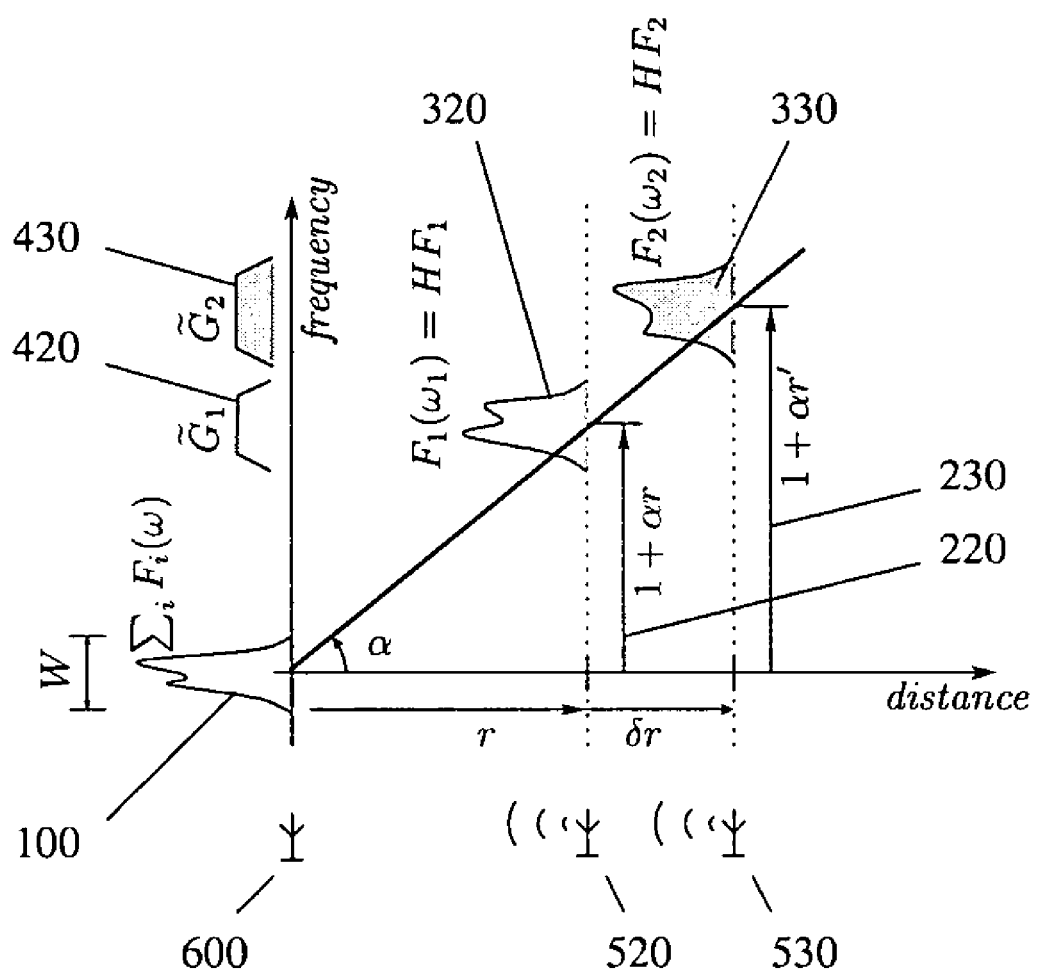
FIG. 1 illustrates the separability of wave-propagated signals from two or more sources at different distances from the receiver, using a distance-dependent frequency shifting mechanism at a receiver.

FIG. 1 illustrates the inventive procedure for separating signals received from sources at different distances from the receiver, using a graph of the spectral shift as a function of distance. Incoming signals of spectra F(w) and F'(w), from sources [520] and [530] at distances r and $r'=r+\delta r$, respectively, from the receiver [600] located at the origin of the graph are assumed to ordinarily occupy the same frequency band W. The two signals would ordinarily be received together as the combined signal $\Sigma_j F_j(w) \equiv \{F_j\}$ [100] and interfere with each other's reception at the receiver.

By applying Step B of the inventive procedure as given in the Summary, the receiver causes the spectra of these component signals to be shifted in proportion to the source distances using the method described in the copending application, i.e. by frequency factors $(1+\alpha r)$ [220] and $(1+\alpha r')$ [230]. The component spectra then occupy the shifted bands $F_1(w_1) \equiv H(\alpha)F_1(w) \equiv HF_1$ [320] and $F_2(w_1) \equiv H(\alpha)F_2(w) \equiv HF_2$ [330], respectively. If the shifted component spectra no longer overlap, as shown, either signal can be separated by applying a suitable band-pass filter $\tilde{G}_1$ [420] or $\tilde{G}_2$ [430], according to Step C, to correspondingly select either $HF_1$ [320] or $HF_2$ [330], respectively.

This extracted signal, say $HF_1 \equiv \tilde{G}_1 H \Sigma_j F_j$, has to be shifted back to its original band as $F_1(w)$ [120] to be usable. This shift would be best done using the reverse shift mechanism $H^{-1}(\alpha) \equiv H(-\alpha)$, according to Step D. The above steps form the basic inventive procedure, and are summarized in FIG. 2 as a time sequence of operations applicable to narrow band sources with sufficient distances between them. As mentioned in the Summary, frequency modulation or mixing with intermediate frequency signals can be additionally applied in Steps B and D, and the return shift operation $H^{-1}$ of Step D can be replaced by these methods.

Figure 3:
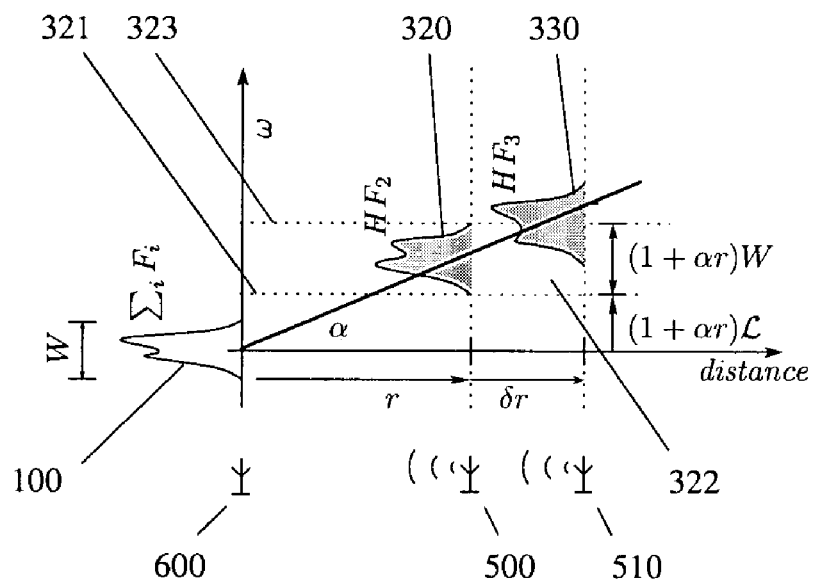
FIG. 3 demonstrates the problem of spectral shadow that occurs with closely located sources, or signals with low frequency content, or with inadequate distance-dependent frequency shifting.

FIG. 3 illustrates the problem of spectral shadow, which arises whenever the sources are too close ($\delta r_i \ll r_i$), the applied temporal parallax ($\alpha$) is too small, or the signal contains very low frequencies ($\varsigma \ll W$ or $\varsigma \approx 0$), so that equation (13) is not satisfied. The figure shows that under any of these conditions, the shifted spectra overlap and cannot be separated using a band-pass filter. If, further, the sources are of nearly equal strength, the shifted spectrum of the nearer source, $F_1(w_1)$ [320], in effect casts a shadow [322] over the shifted spectrum $F_2(w_2)$ [330] of the farther source, i.e. that portions of the latter, $F_2(w_2)$ [330], that fall within this shadow will suffer interference from the nearer source. If the signals are frequency or spread-spectrum modulated, for which a receiver typically recovers the carrier coherently using a phase-lock circuit, the farther or otherwise weaker source would be likely rejected altogether, regardless of which source was desired.

Further, FIG. 3 also illustrates the spectral widening property of the H operators, which exacerbates the shadow problem. Widening occurs because the lower bound [321] of the shifted spectrum would have been shifted by $(1+\alpha r)\mathcal{L}$, which is less than the shift $(1+\alpha r)\mathcal{H}$ contained in the upper bound [323] of the shifted spectrum, so that the shifted bandwidth is itself greater than W, and the spectral shadow [322] cast by the source becomes greater than W by the same factor $(1+\alpha r)$, as shown.

Figure 2:
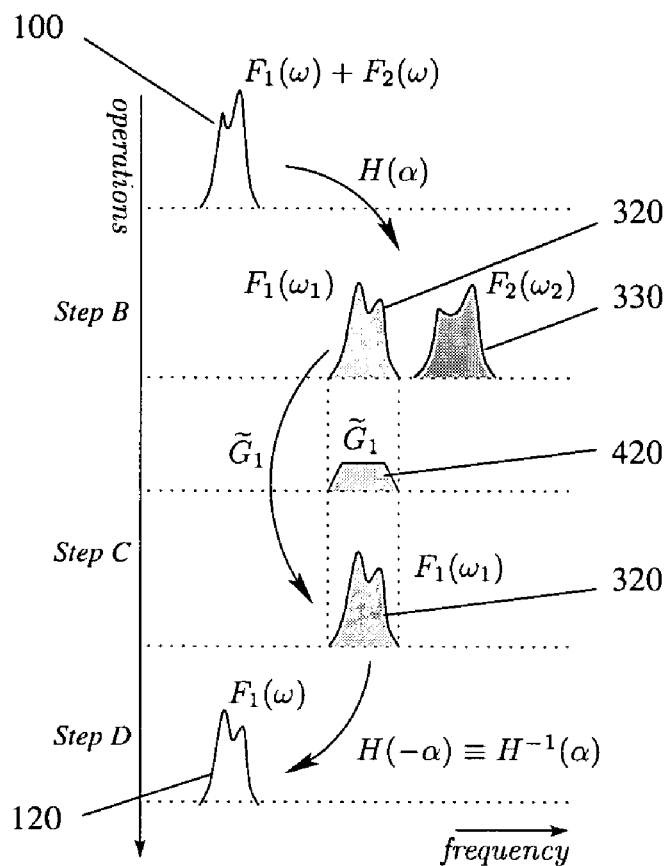
FIG. 2 summarizes the simplified inventive procedure for selecting a desired signal in the scenario of FIG. 1.

The inventive solution for the spectral shadow problem, as formally treated in the Summary, is to partition the incoming combined signal into two or more subbands, to then apply the procedure of FIG. 2 separately to each of the subbands, and lastly, recombine the subbands to obtain the separated signal spectrum. In the example of FIG. 3, since the shadow [322] covers roughly half of the second source spectrum [330], separation can be achieved by partitioning the input signal into two subbands, as illustrated in FIGS. 4 and 5, showing the results of applying Step B to the lower and the upper subbands, respectively.

Figure 4:
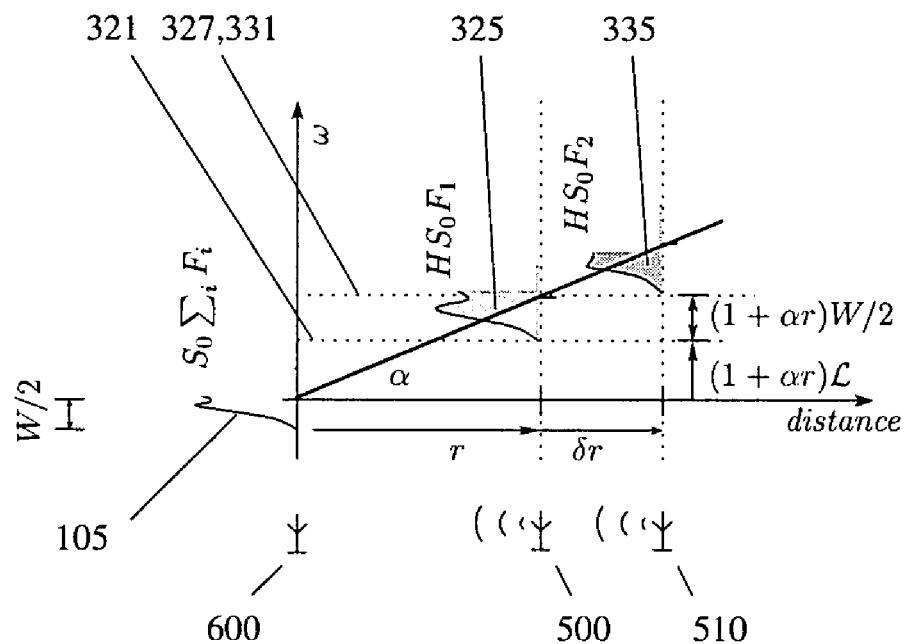
FIG. 4 illustrates separability of the lower half of the signal bandwidth in the scenario of FIG. 3.

As shown in FIG. 4, the lower subband $S_0\Sigma_j F_j$ [105] of the combined incoming signal, obtained from the lower subband filter $S_0$ in Step A, separates, under the inventive operation $H(\alpha)$, into the shifted component spectra $S_0 H F_1$ [325] and $S_0 H F_2$ [335]. If just separated, the shifted lower bound [331] of the second signal will coincide with the shifted upper bound [327] of the first. The lower subbands become separable because the lower subband of the first source no longer casts a shadow on the lower subband of the second though both are shifted by the same parallax factor $\alpha$.

Figure 5:
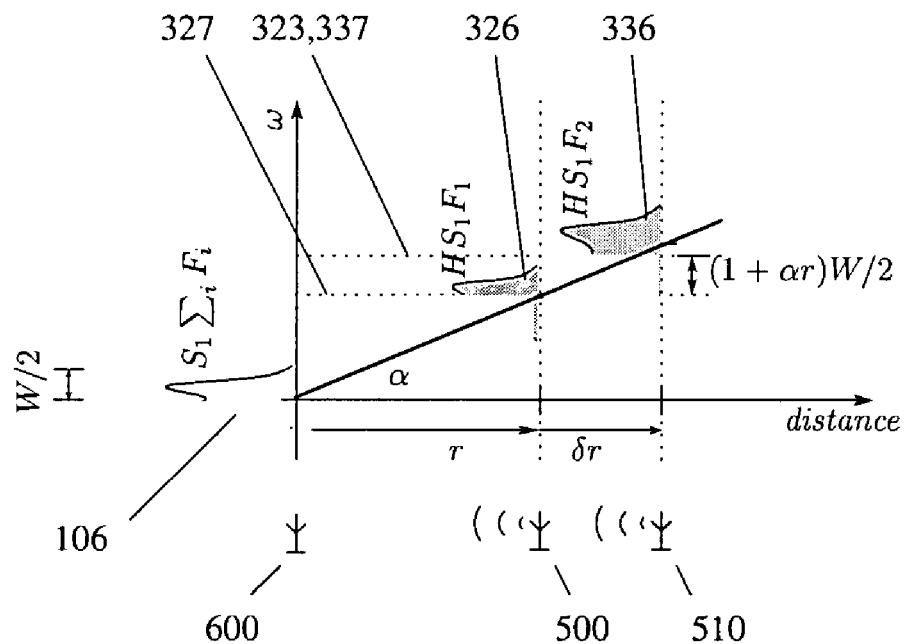
FIG. 5 illustrates separability of the upper half of the signal bandwidth in the scenario of FIG. 3.

FIG. 5 shows the corresponding separation of the upper subband $S_1\Sigma_j F_j$ [106] of the combined incoming signal, obtained from the lower subband filter $S_1$ in Step A, into the shifted component spectra $S_1 H F_1$ [326] and $S_1 H F_2$ [336]. Again, if just separated, the shifted lower bound [337] of the second signal will coincide with the shifted upper bound [323] of the first. The shadow would range from the shifted lower bound [327] to the shifted upper bound [323], and fails to cover the shifted subband [336] of the second source.

Figure 6:
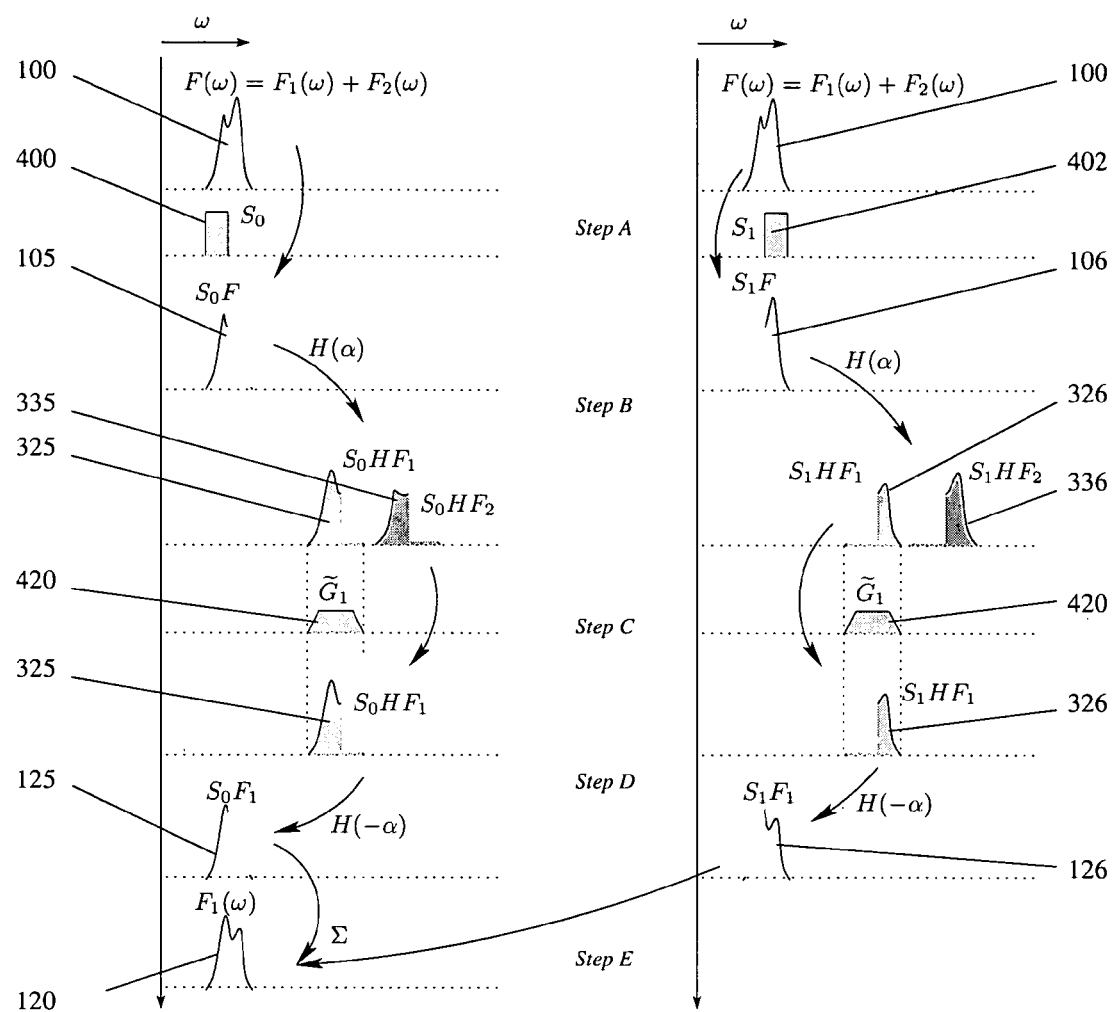
FIG. 6 summarizes the inventive procedure for selecting a desired signal in the scenario of FIG. 3.

FIG. 6 summarizes the complete inventive procedure including the separation into lower [105] and upper [106] subbands in Step A, by means of the lower and the upper subband filters [400] and [402,] respectively, to eventually obtain the extracted lower [125] and upper [126] subbands of the desired signal $F_1$ [120] from the first source, and recombination of these extracted subbands in Step E. As mentioned in the Summary, Step E, recombination, can be performed before applying the reverse shift, i.e. before Step D, which would be useful for reducing the number of operations. The figure incidentally also illustrates that narrower filters could be used for the source selection, in the place of $\tilde{G}_1$ [420], and that $\alpha$ could be made smaller as well.

Figure 7:
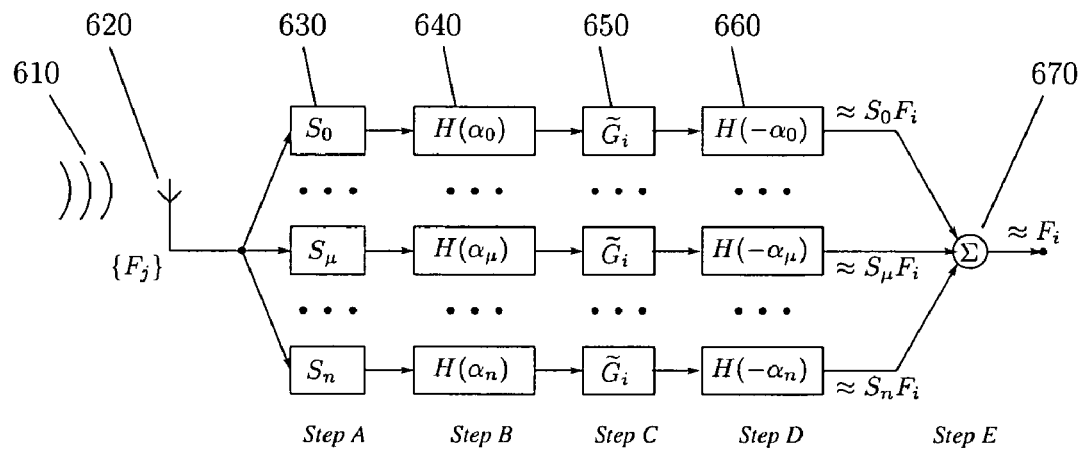
FIG. 7 is a block diagram for a receiver implementing the inventive procedure of FIG. 6.

FIG. 7 is a block diagram of a receiver incorporating the complete inventive procedure described in FIG. 6. It shows incoming electromagnetic (or acoustic) waves [610] being collected by an antenna (or microphone) [620] to produce the combined input signal $\{F_j(w)\}$. This combined signal is fed to a bank of input subband filters [630] to produce the combined subband signals $S_\mu\{F_j\}$ as Step A. These combined subband signals are then subjected to Step B using a bank of frequency shifting mechanisms [640] per the copending application, to get the shifted subband signals $H(\alpha_\mu)S_\mu\{F_j\}$, in which the contributions from the individual sources are already separated in frequency as shown in the preceding figures. In order to select the desired source $s_i$ and suppress the contributions from the remaining sources, these shifted subband signals $H(\alpha_\mu)S_\mu\{F_j\}$ are then fed to the band-pass selection filter bank [650], as Step C, to obtain the shifted subbands $\tilde{G}_i H(\alpha_\mu)S_\mu\{F_j\} \approx H(\alpha_\mu)G_i S_\mu\{F_j\} \approx H(\alpha_\mu)S_\mu F_i$ of the desired signal $F_i$, per equations (6) and (7). These shifted subbands are then down-shifted by a bank of reverse shifting mechanisms [660] (Step D), yielding $H(-\alpha_\mu)H(\alpha_\mu)S_\mu F_i \approx S_\mu F_i$, the subbands of the desired signal, and recombined by a summing device [670], which can be as simple as an operational amplifier (op-amp), to obtain $\Sigma_\mu S_\mu F_i = F_i$, the desired signal.

Figure 8:
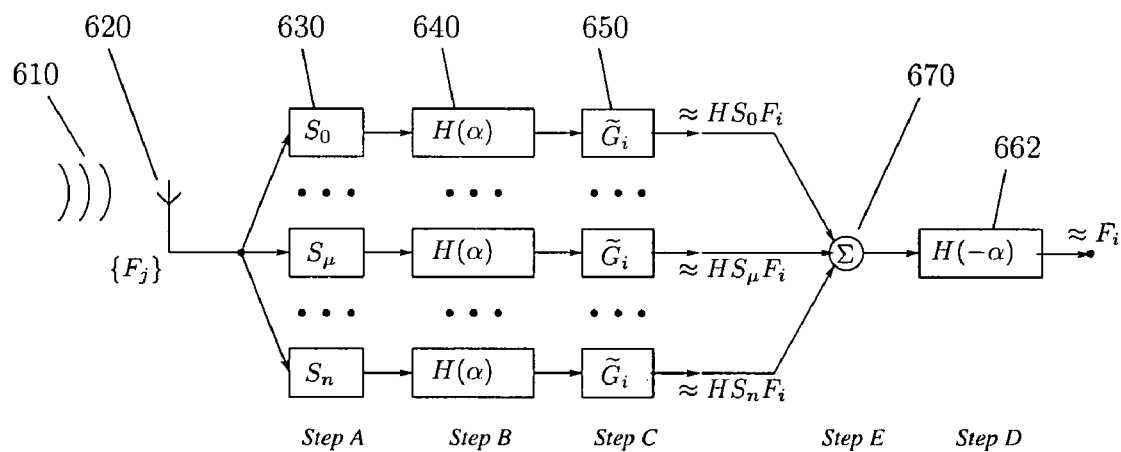
FIG. 8 is a block diagram for a simpler version of the receiver of FIG. 6.

FIG. 8 is a simpler version of the receiver of FIG. 7, in which the summing device is applied before down-shifting, which is only possible when the same value of $\alpha$ is used in each of the frequency shifting mechanisms [640]. In this case, the outputs of the band-pass selection filter bank [650] are immediately recombined by the summing device [670] to produce the desired signal, except that it is still expanded and shifted in frequency as $\Sigma_\mu H(\alpha)S_\mu F_i = H(\alpha)F_i$, and requires down-shifting by a single reverse shifting mechanisms [662] to yield the desired signal as $H(-\alpha)\Sigma_\mu H(\alpha) S_\mu F_i = F_i$.

Figure 9:
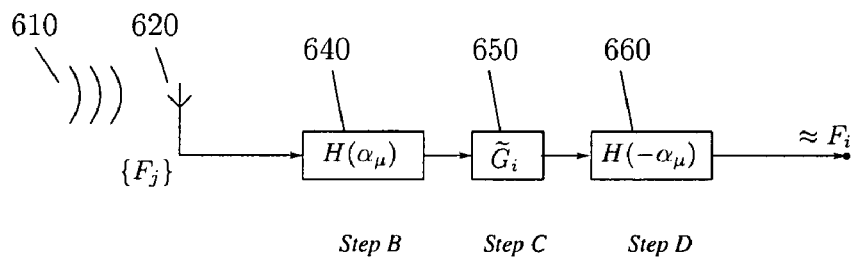
FIG. 9 is a block diagram for a receiver implementing the simplified inventive procedure of FIG. 2.

FIG. 9 shows an even simpler receiver that treats the entire signal bandwidth W as one subband, and thus skips both Steps A and E. Such a receiver would be adequate, as already explained, when the sources are well separated from one another and the signal bandwidth W does not include d.c. It would be generally sufficient for broadcast radio and also mobile (cellular) telephones, since the base stations would be typically spread far apart. The more complex receiver of FIG. 7 would be generally needed at the cellular base stations, however, as the mobile (cellular) phones could even be situated side by side.

Figure 10:
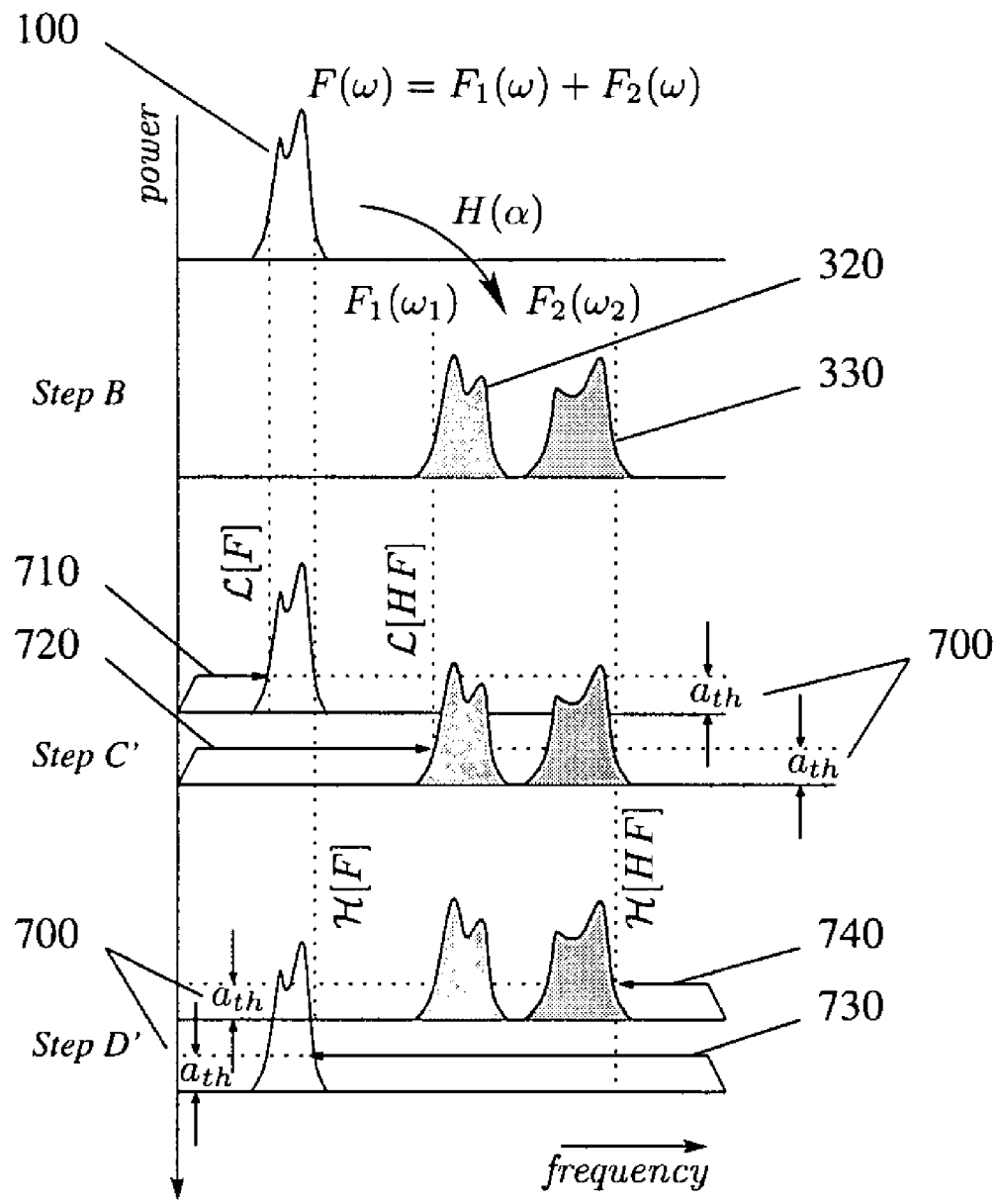
FIG. 10 shows the alternative steps in the simplified inventive procedure to determine the spread of sources.

The related inventive method for detecting interference and estimating the source distribution, given by Steps C' and D' in the Summary, is explained in FIG. 10 using the same combined input signal [100] as in the preceding figures. After Step B, both the original combined incoming signal spectrum [100], and its shifted spectrum, comprising the shifted components [320] and [330] both would be available to the receiver using any applicable means of spectral analysis, including digital signal processing, as typically used for radio or acoustic signals and refraction or diffraction, e.g. for optical, microwave or sonar signals. In the latter case, it is common practice in related arts like modern astronomy to convert the resulting spectrum to digital form for further processing, storage and viewing. It is straightforward, therefore, to also apply smoothening and interpolation, to compute autocorrelation of the spectral distributions, and to average over several successive frames, as necessary to obtain good estimates of the spectral distributions.

Step C' then consists of seeking, from the low frequency end of the measured domain, the first crossings of the obtained distributions above a suitably chosen threshold $a_{th}$ [700], as indicated by the arrows [710] and [720], thereby obtaining the values $\mathcal{L}[\{F_j\}]$ and $\mathcal{L}[H(\alpha)\{F_j\}]$ as the respective abscissae. An estimate of the distance $r_{min}$ to the nearest source is then computed from the relation $$r_{min} = \alpha^{-1}\left(\frac{\mathcal{L}[H(\alpha)\{F_j\}]}{\mathcal{L}[\{F_j\}]} - 1\right), \quad (26)$$

which is the specialization of equation (17) to a single subband encompassing the full signal bandwidth W. Step D' correspondingly consists of seeking, from the high frequency end of the measured domain, the first crossings of the obtained distributions above the same threshold $a_{th}$ [700], as indicated by the arrows [730] and [740], to obtain the values $\mathcal{H}[\{F_j\}]$ and $\mathcal{H}[\mathrm{H}(\alpha)\{F_j\}]$ as the respective abscissae. The distance $r_{max}$ to the farthest source is then estimated using the relation $$r_{max} = \alpha^{-1}\left(\frac{\mathcal{H}[H(\alpha)\{F_j\}]}{\mathcal{H}[\{F_j\}]} - 1\right), \quad (27)$$

which similarly specializes equation (19) to a single subband encompassing the full nominal signal bandwidth W. As remarked in the Summary, these two steps could be performed in the reverse order, i.e. Step D' before Step C', since the crossing detections are independent, and for the same reason, it would be trivial to perform these steps simultaneously or in random order in a receiver, for example, as independent threads of execution in a software implementation.

It would be trivial to extend this procedure for measuring $r_{min}$ and $r_{max}$ identically to each of the subbands $S_\mu\{F(w)\} \equiv \{F_\mu(w)\}$ of the combined received signal to compute the corresponding values $r_{min}^{(\mu)}$ and $r_{max}^{(\mu)}$ for each subband, and to thereby arrive at the minimum and maximum spread estimates defined in equation (21), or other suitable statistics from these measurements.

Figure 11:
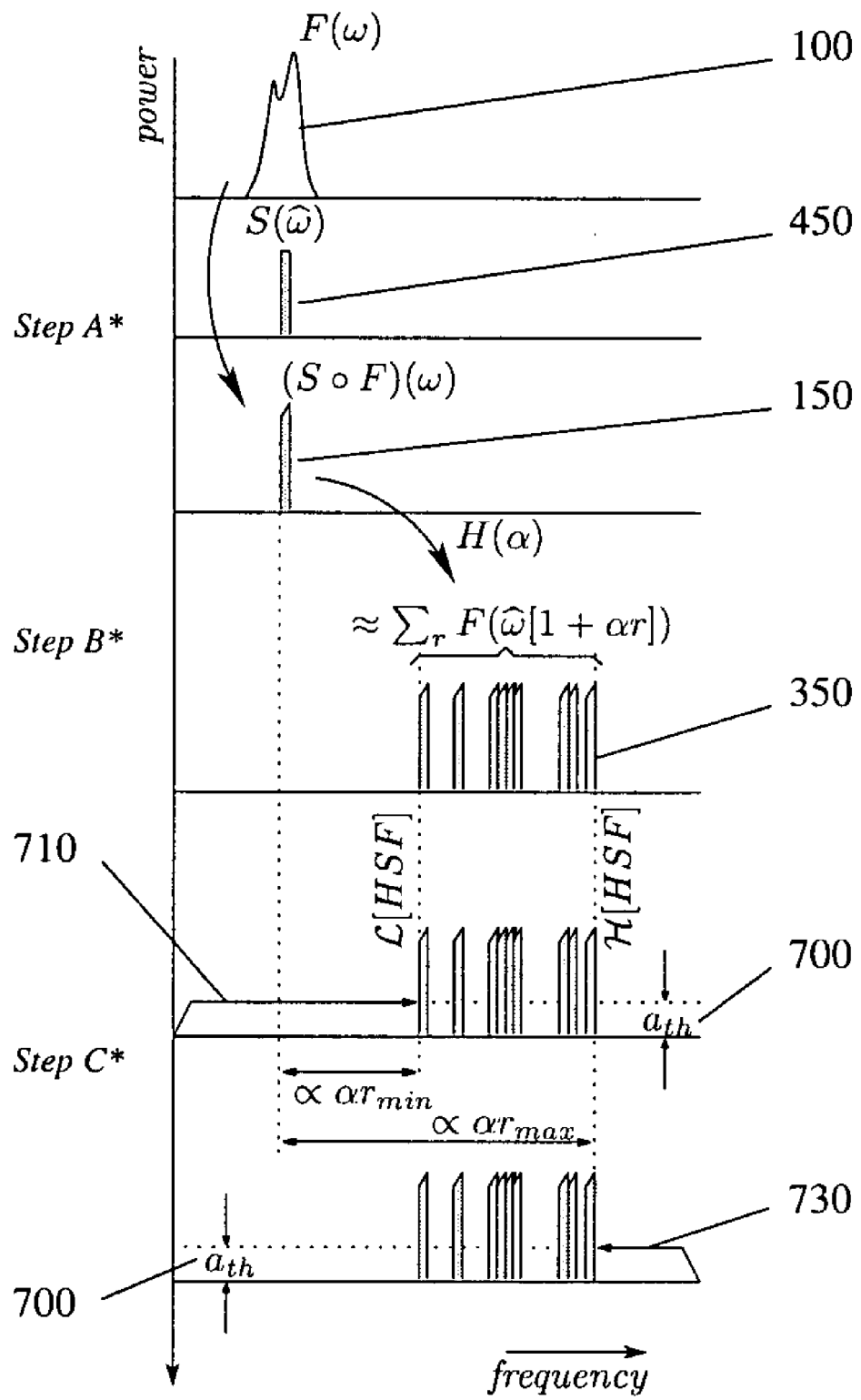
FIG. 11 shows the modified inventive procedure for measuring the spread of sources using a scanning filter.

Scanning with a single, narrow subband filter would be superior for detecting interfering signal or noise sources within the signal band W, per the modified inventive procedure, Steps A* through C* given in the Summary. This is illustrated in FIG. 11, in which a single subband filter [450] with a very narrow passband $\delta W \ll W$ is used to scan the received signal spectrum F(w) [100], to obtain the filtered signal (S∘F)(w) [150] at each instantaneous position of the filter [450] (Step A*). In Step B*, this filtered signal is subjected to the frequency shifting mechanism of the copending application to yield the shifted spectral distribution $H(\alpha)(S \circ F)(w) = \Sigma_r F(w/1+\alpha r]) \approx \Sigma_r F(\hat{w}/1+\alpha r])$ [350]. As Step C*, the threshold frequency bound detectors are again applied, as shown by the arrows [710] and [730] to determine the low and high frequency bounds of the shifted distribution, respectively, for computing the source distribution functions $\delta r_{min}(\delta W)$ and $\delta r_{max}(\delta W)$ per equation (24).

Figure 12:
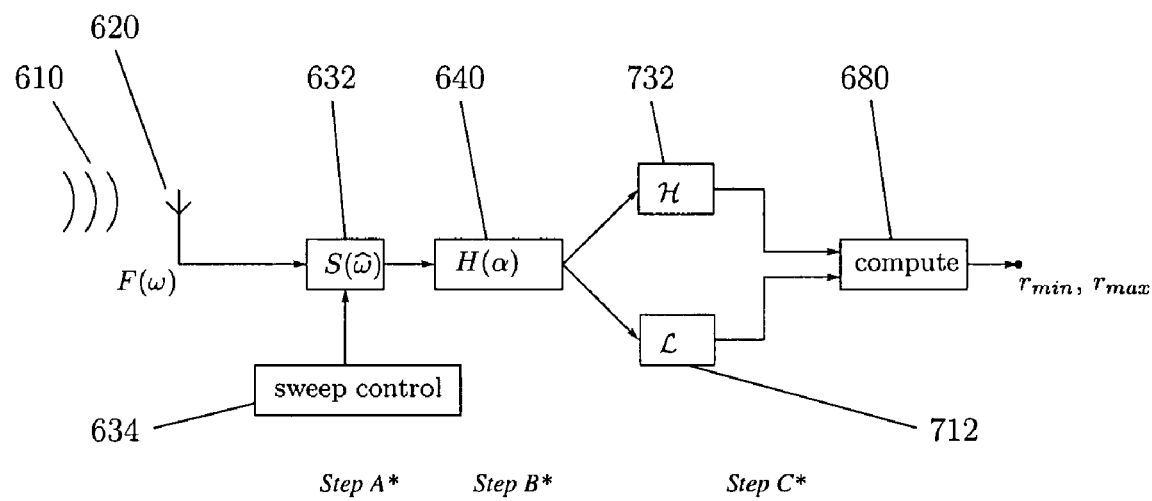
FIG. 12 is a block diagram for a receiver implementing the modified inventive procedure of FIG. 11.

FIG. 12 is a block diagram of a receiver incorporating the scanning procedure of FIG. 11. In this, the received signal (or combination of signals) from the antenna [620] is first subjected to narrow band filtering, in accordance with Step A*, by a subband filter [450], whose centre frequency is made to periodically sweep over the input band of frequencies by a sweep controller [634]. The resulting filtered signal is then input to the frequency shift mechanism [642], per Step B*, and its frequency bounds are measured, per Step C*, by the high [732] and the low [712], respectively. The bound values obtained are used to compute $r_{min}$ and $r_{max}$, applying equation (24), or other related statistics, by the source distribution computer [680].

Figure 13:
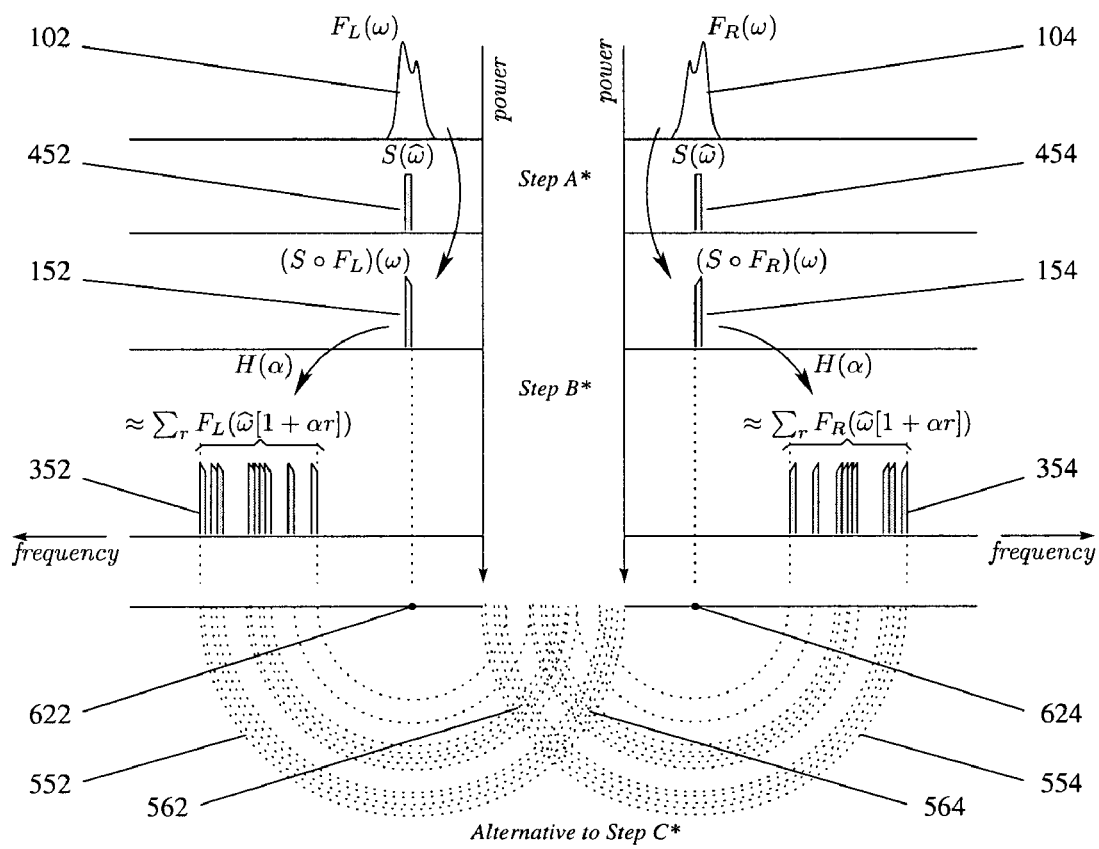
FIG. 13 illustrates the "scatter plot" approach for displaying the spread of sources.

Related to the scanning procedure is the "scatter plot" method mentioned in the Summary, illustrated in FIG. 13 for the case of bistatic (stereophonic) antenna (microphone) feeds [622] and [624] that respectively provide two input signals $F_L(w)$ [102] and $F_R(w)$ [104]. These signals are first scanned simultaneously by the identical narrow subband filters [452] and [454], per Step A*, and then shifted by identical frequency shifting mechanisms to yield the shifted distributions $H(\alpha)(S \circ F_L)(w) = \Sigma_r F_L(w/1+\alpha r]) \approx \Sigma_r F_L(\hat{w}/1+\alpha r])$ [352] and $H(\alpha)(S \circ F_R)(w) = \Sigma_r F_R(w/1+\alpha r]) \approx \Sigma_r F_R(\hat{w}/1+\alpha r])$ [354], per Step B*. Next, instead of measuring the frequency bounds according to Step C*, one draws on a separate graph circles [552] and [554] representing the loci of possible source locations, with centres corresponding to the two feeds and radii proportional to the shifts. The resulting concentrations of sparse and dense regions resemble well known two-slit interference patterns of diffraction theory, since each concentration of (signal or noise) sources produces multiple dense regions like [562] and [564]. FIG. 13 also shows that the "scatter plot" is really a technique for combining the source distance distribution data from multiple antenna feeds, as the distribution information from each individual feed is already revealed by the shifted spectral distributions [352] and [354].

The difference between the "scatter plot" and a diffractive interference pattern is that the plot represents the actual spatial distribution of sources, albeit with multiple aliases, whereas diffractive interference is only representative of their spectral distribution. This is because the plot starts with the spectral distribution, whereas in diffraction theory, one starts with a spatial distribution of sources or slits. The method is in this sense an inverse of diffractive interference.

The invention has been described with reference to the preferred embodiment, but it will be appreciated by those of ordinary skill in the arts of general physics, electronics and communication technologies that numerous modifications and variations are possible in the light of the above disclosure. For example, the invention can be applied to sound and underwater communication, and to transmission lines or optical fibres. Indeed, as the filtering, recombining, downshifting and the key operation of shifting spectra in proportion to the contributing source distances can be conceivably applied to signals over any kind of propagating waves, provided only that they obey the wave equation, as particularly described in the copending application for the shifting operation, the invention could be applied even to matter or gravitational wave signals.

As stated in the Summary, Step D could be replaced by a down-converter, optionally with a modulation-demodulation stage to scale back the bandwidth by the factor $(1+\alpha r)$. The scaling down may be obviated by moving the modulation-demodulation stage before Steps A or B, so that the bandwidth is already scaled down by an estimate of the $(1+\alpha r)$ factor for the desired source. This would also require narrower subbanding filters $S_\mu$ and source selection filters $G_i$, which may be useful from the perspective of ensuring constant or linear phase over the filter spectra, since phase distortions can affect the spectral phase gradient and the linearity of separation assumed in FIGS. 1, 3, 4 and 5.

Likewise, the problem of spectral shadow and the inventive use of subbanding to overcome it have been illustrated using just two subbands, but it would be clear to those skilled in the related arts that more than two subbands may often be necessary and that the lowest subband, especially if including 0 frequency (d.c.), may need to be abandoned altogether, as stated in the Summary.

As stated in the Background and in the Summary, the present invention may be enhanced with direction-sensitive antenna technology to also provide separation of signals from sources at almost the same distance from the receiver, but differing in their directions. The inventive method may be conversely employed as an alternative to directional antennae in order to separate sources that are too close in direction. The present invention may likewise be combined with content-based separation methods including, but not limited to, amplitude, frequency, phase and spread-spectrum modulations, or TDM, and autocorrelative methods. All such modifications, generalizations and variations are intended within the scope and spirit of the invention as defined in the claims appended hereto.

I claim:

1. A method for separating at a receiver a desired signal from a combination of signals received from a multitude of sources,
   each of the sources being located at a different distance from the receiver,
   the desired signal being contributed by a desired source at a distance,
   and each of the signals and their combination occupying an original band of frequencies, the method comprising the steps of
   splitting the received combination of signals into one or more spectral subbands;
   expanding each of the spectral subbands into a corresponding plurality of component subband spectra, each plurality corresponding to one of the multitude of sources and being shifted in frequency in proportion to the distance from the receiver of the corresponding one of the multitude of sources;
   selecting in each plurality of component subband spectra a shifted component subband spectrum corresponding to the desired source;
   down-transforming each selected shifted component subband spectrum back to the original band of frequencies;
   and recombining the selected shifted component subband spectra to recover the desired signal.

2. The method of claim 1, wherein the number of spectral subbands is exactly one, so that the first and last steps are vacuous.

3. The method of claim 1, wherein the down-transforming step is performed after the recombining step.

4. The method of claim 1, wherein the step of selecting the shifted component subband spectra is performed using one or more band-pass filters.

5. The method of claim 1, wherein the step of down-transforming each selected shifted component subband spectrum is accomplished by scanning its phase distribution.

6. The method of claim 1, wherein the step of down-transforming each selected shifted component subband spectrum is accomplished by multiplying the selected shifted component subband spectrum with an intermediate frequency carrier signal.

7. The method of claim 1, wherein the signals are propagated by acoustic waves.

8. The method of claim 1, wherein the signals are propagated by matter or gravitational waves.

9. The method of claim 1, wherein the step of expanding each spectral subband is accomplished by scanning the phase distribution of the spectral subband.

10. The method of claim 9 wherein the scanning step is performed by digital signal processing.

11. The method of claim 9 wherein the scanning step comprises varying the grating intervals of a diffraction grating or a dimension of a resonant cavity.

12. A method for obtaining, from a combination of signals received at receiver from a multitude of sources, the distribution distances to the multitude of sources, each of the signals and their combination occupying an original band of frequencies, the method comprising the steps of
    splitting the received combination of signals into one or more spectral subbands each having known or measured upper and lower frequency bounds;
    expanding each of the spectral subband into corresponding plurality of component subband spectra, each plurality of component subband spectra corresponding to one of the multitude of sources and being shifted in frequency in proportion to the distance from the receiver of the corresponding one of the multitude of sources;
    and computing the distance distribution to the multitude of sources from the expanded pluralities of component subband spectra.

13. The method of claim 12 wherein the number of spectral subbands is exactly one.

14. The method of claim 13 wherein the spectral subband is fixed with upper and lower frequency bounds corresponding to the original band of frequencies.

15. The method of claim 13 wherein the spectral subband has a variable centre frequency and the centre frequency is varied within the original band of frequencies.

16. The method of claim 12 wherein the step of computing the distance distribution comprises the steps of
    measuring upper and lower frequency bounds of each plurality of the component subband spectra;
    and computing the minimum and the maximum distances to the multitude of signal sources from the ratios of the measured upper and lower frequency bounds of the pluralities of the component subband spectra to the corresponding known or measured upper and lower frequency bounds of the spectral subbands, respectively.

17. The method of claim 12 wherein the step of computing the distance distribution comprises plotting an expanded plurality of component subband spectra on a graph.

18. A device for separating an electromagnetic or other wave-propagated signal emitted by a desired source from a combination of signals emitted by a multitude of such sources each located at a different distance from the device, each of the signals and their combination occupying an original band of frequencies, the device comprising;
    one or more spectral expansion means for expanding the combination of signals or subbands of the combination of signals to plurality of component spectra or component subband spectra, respectively, each plurality of componet spectra or component subband spectra corresponding to one of the multitude of sources and shifted in frequency in proportion to the distance from the device of the corresponding one of the multitude of sources;
    one or more band pass filter means for selecting an expanded component spectrum or component subband spectra corresponding to the desired source; and
    one or more down transformation means for shifting the selected expanded component spectrum or component subband spectra back to the original band of frequencies to form the desired signal r subbands of desired signal, respectively.

19. The device of claim 18, additionally comprising a subband filtering means for dividing the combination of signals into one or more subbands, and a summing means for recombining the subband spectra of the desired signal back into the desired signal.

20. The device of claim 19, comprising a single down-transformation means following the summing means.

* * * * *